UNITED STATES PATENT OFFICE.

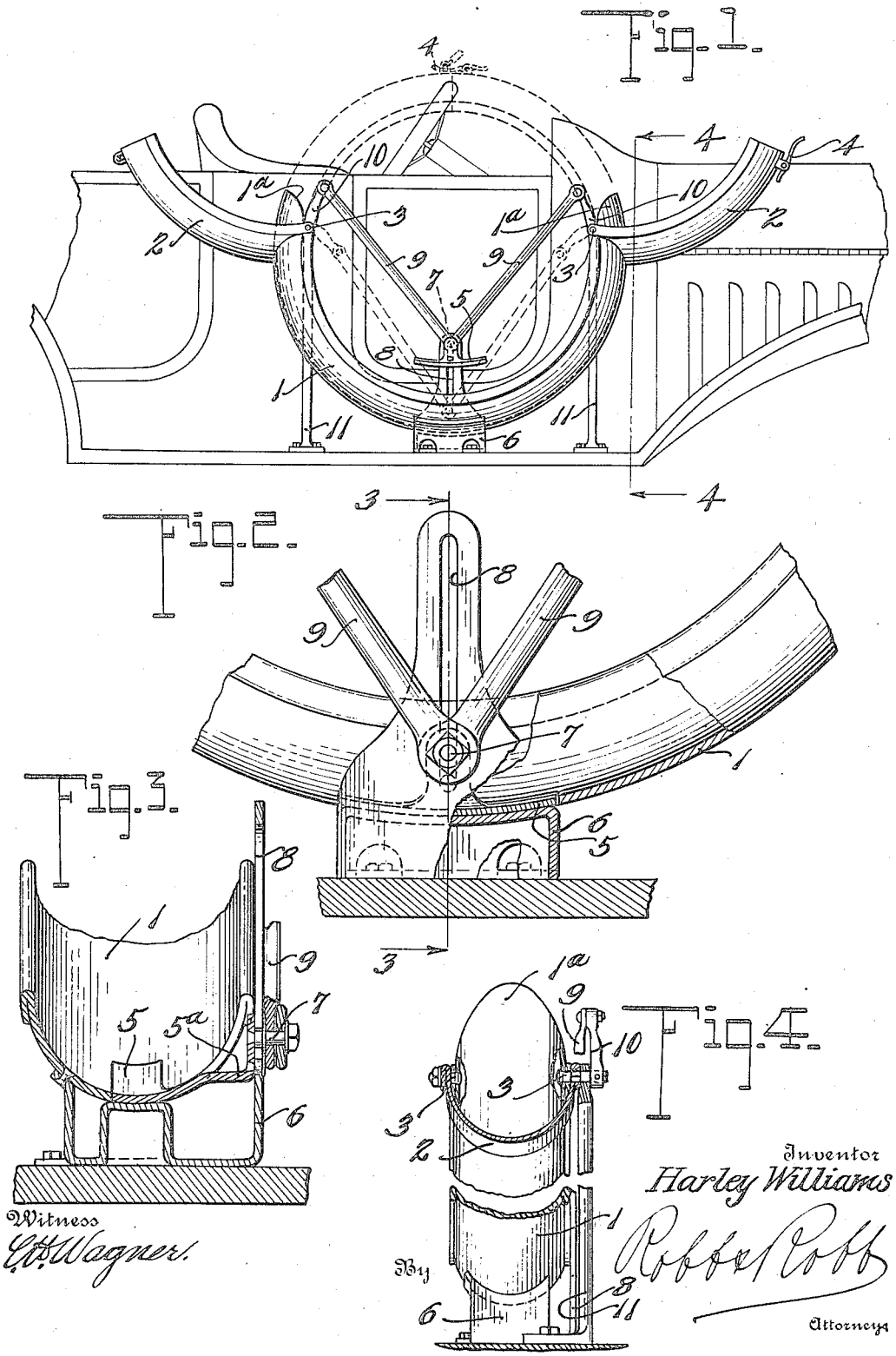

HARLEY WILLIAMS, OF HALLTOWN, MISSOURI.

TIRE-HOLDER.

1,197,418. Specification of Letters Patent. Patented Sept. 5, 1916.

Application filed March 13, 1916. Serial No. 83,864.

*To all whom it may concern:*

Be it known that I, HARLEY WILLIAMS, a citizen of the United States, residing at Halltown, in the county of Lawrence and State of Missouri, have invented certain new and useful Improvements in Tire-Holders, of which the following is a specification.

This invention comprises an improved form of holder of the type ordinarily known in the art of motor vehicles as spare casing holders.

The object of the invention has been to provide means of the nature specified wherein the holder proper is made up of sections, certain of which are so mounted as to render the tire or casing disposed in the holder very readily accessible for purposes of removal, and in order that the casing may be very easily disposed in the holder.

The invention further embodies special instrumentalities adapted to be operated incident to opening or movement of a section of the holder whereby to dislodge the tire or casing from the holder wherein it may become wedged and tightly held owing to a considerable period of non-use.

A further object of the invention has been to so design the holder and its coacting parts that the device may be attractive in appearance and susceptible of being readily mounted either at the side or back of the motor vehicle, in the customary manner.

For a full understanding of the present invention, reference is to be had to the following description and the accompanying drawings, in which:—

Figure 1 is a fragmentary side view of an automobile equipped with a holder embodying the invention, the parts of the holder being adjustable to open positions. Fig. 2 is an enlarged view partly in section bringing out more clearly the arrangement of the pusher and the link connections therewith. Fig. 3 is a vertical section on the line 3—3 of Fig. 2. Fig. 4 is a similar section taken about on the line 4—4 of Fig. 1.

A tire holder built in accordance with the invention comprises a comparatively small number of parts, the holder proper including the main semi-circular section 1 and the two sections 2 which together form practically the other half of the wheel. The members 1 and 2 are peculiarly formed in order that they may house the spare casing placed in the holder, as much as possible having in view the purpose of the invention. It will thus be seen, referring to Fig. 1, that the upper ends of the lower section 1 are cut away upon the curved lines 1ª and the lower end of the sections 2 are correspondingly but oppositely cut away in order that a pivotal movement of the sections 2 may be effected. The sections 2 are pivotally connected with the sections 1 as shown at 3, and said sections 2 are therefore movable from the open full line positions in Fig. 1 to the closed dotted line positions of the same figure. Any suitable lock means, shown at 4, may be employed to lock the sections 2 closed so that only authorized access may be had to the holder for the purposes of removal of the casing supported therein.

Having in view the form of the main section 1 which constitutes somewhat more than half of the circular holder construction, it will be apparent that a tire or casing disposed in the holder will fit snugly in the said section 1 and will be held snugly from displacement by the sections 2. For the purpose of rendering easy the removal of the tire so that it may be put into use, it is contemplated to provide a pusher 5 in the form of an arc-shaped plate, located at the base of the main section 1, said pusher being formed with a lateral and upwardly extending arm 5ª. The vertical portion of the arm 5ª is slidingly mounted upon a supporting bracket 6 by means of a stud connection 7 attached to said arm and passing through a slot 8 in the upper portion of said bracket 6. The stud 7 is connected by links 9 with arms 10 projecting from the inner lower extremities of the sections 2 at the pivotal portions of the same. The arrangement of the links 9 and arms 10 is such that the opening of one or both of the sections 2 causes upward lifting movement on the links 9, raises the pusher 5 and causes said pusher to exert a lifting force upon the tire or casing disposed in the holder, whereby to facilitate the removal of the latter in an evident manner.

The bracket 6 is preferably so formed that it not only constitutes the guiding support of the pusher 5 but likewise supports the holder itself at the lower middle portion of the same, in coöperation with standards 11 or similar supporting parts. The particular means used to support the holder, however, are not material because the brackets and standards may be of such form and size as to admit of the mounting of the holder either at the side of a machine or at the back. The base of the main section 1 of the holder may be cut away so as to afford a space in which the pusher 5 may rest in a position in which it is substantially flush with the bottom of the holder.

Specifically speaking the upper sections 2 are cut outwardly on a curved line intermediate the lower inner extremities where the pivotal connections 3 are located, and owing to this formation the portions of the sections 2 between the pivoted extremities are adapted to abut with the outer side of the lower section 1 so as to hold the sections 2 in the full line positions illustrated in Fig. 1.

It is contemplated that the holder sections may be made out of aluminum or any other like metal and the finish of the same will be to accord, of course, with the class of automobile in connection with which the device is intended to be used.

Having thus described the invention what is claimed as new is:

1. A spare tire holder for automobiles, the same comprising a lower approximately semi-circular section, and an upper section pivotally connected with the lower section, the lower section being cut away on an inwardly extending curved line at the upper extremity of said lower section, and the upper section being cut away upon an outwardly curving line intermediate its pivoted portions whereby to permit of the necessary pivotal movement of said section in relation to the lower section.

2. A spare tire holder for automobiles, the same comprising an approximately semi-circular section, means for supporting said section upon an automobile, said lower section being cut away at its upper extremities on inwardly curved lines, upper sections pivoted at their lower inner ends to the upper ends of the said lower section, said upper sections being cut away outwardly from their pivotal portions whereby to permit of relative outward movement in relation to the lower section and whereby to permit said sections at their cut-away portions to abut with the outer side of the lower section, said upper sections being adapted for meeting engagement at their upper outer ends, and means for connecting the upper sections together at the meeting ends.

3. A spare tire holder for automobiles, the same comprising a lower section, and an upper section movably mounted in relation to the lower section, a pusher mounted adjacent to the lower section and adapted to forcibly move a tire disposed in the holder, and connections intermediate the upper section and said pusher whereby to move the latter incident to the movement of the upper section.

4. A spare tire holder for automobiles, the same comprising a lower section, and an upper section movably mounted in relation to the lower section, a pusher mounted adjacent to the lower section and adapted to forcibly move a tire disposed in the holder, a pivotal connection intermediate the upper section and the lower section, an arm projecting from the upper section, and a link connection between said arm and said pusher whereby the pusher will be moved incident to movement of the arm.

5. A spare tire holder for automobiles, the same comprising an approximately semi-circular lower section, upper sections pivotally mounted upon said lower section at the upper ends of the latter and adapted to substantially form continuations of the lower section, arms projecting from said upper sections, a pusher disposed at the lower portion of the lower section, and link connections intermediate said pusher and the arms of the upper section whereby the movement of one or both of the upper sections will effect lifting action on the pusher for the purpose described.

In testimony whereof I affix my signature.

HARLEY WILLIAMS.